Patented June 2, 1925.

1,540,425

UNITED STATES PATENT OFFICE.

LONNIE W. RYAN, OF CHICAGO, ILLINOIS, ASSIGNOR TO LINDSAY LIGHT COMPANY, OF CHICAGO, ILLINOIS, A CORPORATION OF ILLINOIS.

ART OF MAKING ZIRCONIUM COMPOUNDS.

No Drawing. Application filed May 23, 1923. Serial No. 641,008.

*To all whom it may concern:*

Be it known that I, LONNIE W. RYAN, a citizen of the United States, residing at Chicago, in the county of Cook and State of Illinois, have invented a new and useful Improvement in the Art of Making Zirconium Compounds, of which the following is a specification.

In a co-pending application Serial No. 641,007, filed of even date herewith, a method has been described for the precipitation of basic zirconium sulfates in granular form from aqueous zirconium sulfate solutions by the addition of a suitable alkaline material in the presence of auxiliary ions of strong electrical characteristics, for example, highly electropositive ions, such as the potassium ion, or highly electronegative ions such as the chloride ion. In that application there has been described more specifically the addition of auxiliary ions of highly electropositive character, such as the potassium ion.

In accordance with the present invention, the precipitation of the zirconium from an aqueous zirconium sulfate solution as a granular basic zirconium sulfate may be brought about by the addition of an alkali, an auxiliary, highly electro-negative ion, such as the chloride ion, being present. A soluble chloride compound, for example, may be added to the aqueous zirconium sulfate solution prior to the addition of an alkali, such as sodium carbonate, sodium hydroxide, potassium carbonate or the like. The proportion of chloride ion should be sufficient to provide at least one-sixteenth (1/16) to one-twentieth (1/20) mole for each mole of zirconium present, and preferably from one-eighth to one-half mole. Thus, as a specific example, to a solution containing 100 parts of zirconium oxide (as sulfate), we may add 100 parts of sodium chloride (approximately one-half mole per mole of zirconium). Equivalent proportions of ammonium chloride, potassium chloride, magnesium chloride or other chlorides not forming insoluble sulfates may be employed, care being taken in the latter case that insufficient potassium chloride is employed to form insoluble double salts with the zirconium.

After the chloride ion has been provided, I may add a suitable alkali (one which does not form insoluble sulfates), such as sodium carbonate, sodium hydroxide, potassium hydroxide or the like, until substantially all of the zirconium is precipitated. Ordinarily the alkali is added until the solution will turn yellow methyl orange paper only to a faint pink. The zirconium is precipitated as a granular basic sulfate, white, almost insoluble in water, but very soluble in dilute sulfuric and other acids. It may be ignited for conversion into the oxide or may readily be converted into the hydroxide, for example, by stirring with a cold solution of sodium hydroxide. It hydrolyzes readily during washing and the proportion of $SO_3$ present to $ZrO_2$ may vary from 35 to 41%.

In case the aqueous zirconium sulfate solution contains iron, the latter is preferably reduced to the ferrous state prior to the precipitation of the granular basic sulfate, for example, by the addition of a suitable proportion of sodium thiosulfate. The granular basic zirconium sulfate is then precipitated substantially free from iron.

I claim:

1. The method of preparing granular basic zirconium sulfate which comprises adding sodium chloride to an aqueous zirconium sulfate solution and subsequently adding an alkali thereto.

2. The method of preparing a substantially iron-free granular basic zirconium sulfate which comprises reducing an iron containing zirconium sulfate solution, adding sodium chloride thereto and subsequently adding an alkali to effect precipitation of the granular basic sulfate.

LONNIE W. RYAN.